(12) United States Patent
Ohno

(10) Patent No.: US 8,676,469 B2
(45) Date of Patent: Mar. 18, 2014

(54) VEHICLE DRIVE MOTOR CONTROL SYSTEM

(75) Inventor: Akiyoshi Ohno, Shizuoka-Ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 141 days.

(21) Appl. No.: 13/349,042

(22) Filed: Jan. 12, 2012

(65) Prior Publication Data

US 2012/0185143 A1 Jul. 19, 2012

(30) Foreign Application Priority Data

Jan. 14, 2011 (JP) ................................. 2011-005472

(51) Int. Cl.
*G06F 19/00* (2011.01)
(52) U.S. Cl.
USPC .............................. 701/99; 701/102; 701/106
(58) Field of Classification Search
USPC .......................................... 701/99, 102, 106
See application file for complete search history.

(56) References Cited

U.S. PATENT DOCUMENTS

| | | | |
|---|---|---|---|
| 2005/0242760 A1* | 11/2005 | Fujita et al. | 318/434 |
| 2007/0155584 A1* | 7/2007 | Tabata et al. | 477/70 |
| 2007/0247001 A1* | 10/2007 | Nakano | 303/157 |
| 2008/0297073 A1* | 12/2008 | Yatabe et al. | 318/51 |
| 2009/0021198 A1* | 1/2009 | Okamura et al. | 318/400.3 |
| 2009/0236329 A1* | 9/2009 | Sato | 219/660 |
| 2011/0202231 A1* | 8/2011 | Ueno et al. | 701/34 |
| 2011/0231043 A1* | 9/2011 | Ebuchi et al. | 701/22 |
| 2011/0320083 A1* | 12/2011 | Nishimura | 701/22 |

FOREIGN PATENT DOCUMENTS

| | | |
|---|---|---|
| JP | 2010-011545 A | 1/2010 |
| JP | 2010011546 A | 1/2010 |

* cited by examiner

*Primary Examiner* — Calvin Cheung
(74) *Attorney, Agent, or Firm* — Lerner, David, Littenberg, Krumholz & Mentlik, LLP

(57) ABSTRACT

A vehicle drive motor control system is provided, which, when a vehicle drive motor is in a locked state, may urge a driver to make a switch from actuation of an accelerator to actuation of a brake, thereby preventing thermal damage to coils inside the motor. The vehicle drive motor control system is capable of, when a vehicle drive motor is in a locked state as a result of actuating an accelerator, making the vehicle slowly move backward (or providing other stimulus to the driver) by decreasing a maximum drive torque value. This may effectively cause the driver to make the switch from actuation of the accelerator to actuation of the brake.

7 Claims, 4 Drawing Sheets

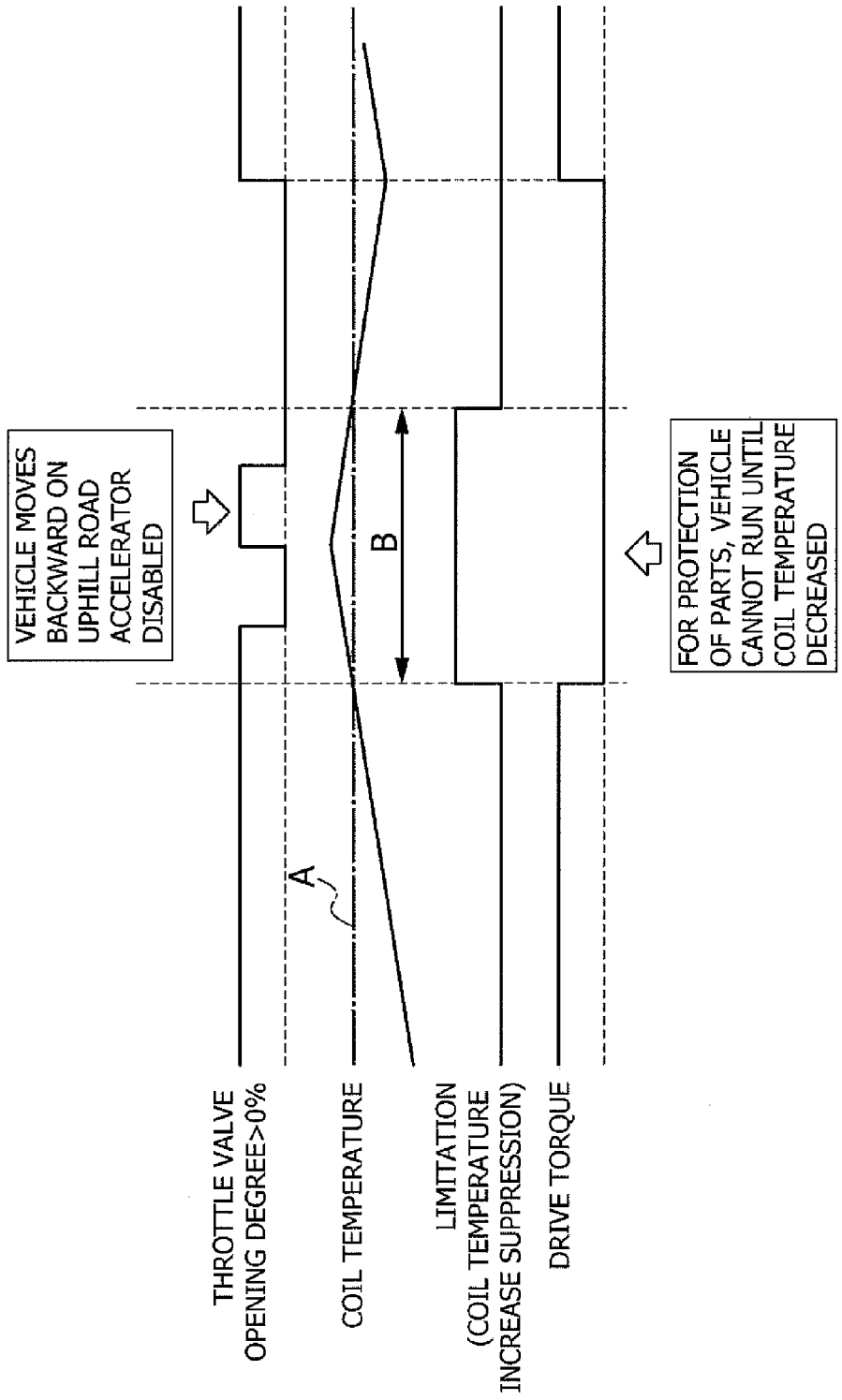

VEHICLE DRIVE MOTOR CONTROL SYSTEM

CROSS-REFERENCE TO RELATED APPLICATIONS

The present application claims priority from Japanese Patent Application No. 2011-005472, filed in the Japanese Patent Office on Jan. 14, 2011, the disclosure of which is hereby incorporated herein by reference.

BACKGROUND OF THE INVENTION

The present invention relates to a vehicle drive motor control system, and specifically, relates to a vehicle drive motor control system that, when a vehicle drive motor is in a locked state, urges a driver to make a switch from actuation of an accelerator to actuation of a brake, thereby preventing thermal damage to coils inside the motor.

In vehicles, such as electric vehicles and series hybrid vehicles, that are moved by a vehicle drive motor, in general, a three-phase alternating-current motor is used, and for example, when such a vehicle is held stopped on an uphill road by actuating an accelerator, rather than using a brake, current is continuously applied to only one phase of the coils inside the motor, which may cause overheating or failure of the coil to which current is applied.

In a conventional vehicle drive motor control system, as illustrated in FIG. 5, when a driver holds the vehicle stopped on an uphill road by actuating an accelerator, a vehicle drive motor enters a locked state, and if the temperature of a coil inside the motor exceeds a set value A, the current applied to the coil is limited to decrease the drive torque, thereby avoiding overheating or failure of the coil. However, when the temperature of the coil exceeds the set value A, if the current applied to the coil is suddenly limited for suppression of increase of the coil temperature, in a current-limitation period B, the accelerator is disabled because of the decrease in drive torque of the motor, resulting in deterioration in drivability.

Therefore, among the conventional vehicle drive motor control systems, there is one in which if it has been determined that a vehicle drive motor is in a locked state, a torque decrease limitation for decreasing a drive torque of the vehicle drive motor at a predetermined decrease ratio and then increasing the decreased drive torque at a predetermined increase ratio is provided, and at least one of the predetermined decrease ratio and the predetermined increase ratio is adjusted so that an average torque during the torque decrease limitation is a torque threshold based on which the temperature of a coil of a particular phase can be used as a base for temperature compensation of coils of the other phases (JP 2010-11545 A).

Also, among the vehicle drive motor control systems, there is one in which when it has been determined that a vehicle drive motor is in a locked state, a first torque decrease limitation for temporarily decreasing a drive torque of the vehicle drive motor and then returning the decreased drive torque to the original drive torque before the decrease is provided, and if the locked state is still not cancelled, a second torque decrease limitation for decreasing the drive torque of the motor to a predetermined torque, which is lower than the torque attained as a result of the decrease in the first torque decrease limitation, is provided (JP 2010-11546 A).

However, with a vehicle drive motor control system in which a drive torque is limited according to the degree of overheating of a coil inside a motor, as illustrated in FIG. 5, once the temperature of the coil increases beyond a set value A, the limitation of the drive torque cannot be cancelled until the coil temperature decreases to a temperature equal to or below the set value A, and thus, a state in which the drive torque cannot return to the original drive torque before the limitation lasts for a long period of time.

BRIEF SUMMARY OF THE INVENTION

An object of the present invention is to provide a vehicle drive motor control system capable of, when a vehicle drive motor is in a locked state as a result of actuating an accelerator, urging a driver to make a switch from the actuation of the accelerator to actuation of a brake, thereby enabling a coil to which current is applied inside the motor to be switched from a coil whose temperature has been increased as a result of current application to another coil.

The present invention provides a vehicle drive motor control system including: voltage conversion means for converting a direct-current voltage to an alternating-current voltage and supplying the alternating-current voltage to a vehicle drive motor; accelerator actuation amount detection means for detecting an accelerator actuation amount for a vehicle; control means for calculating a requested drive torque value based on the accelerator actuation amount detected by the accelerator actuation amount detection means, and controlling the alternating-current voltage output from the voltage conversion means, according to the requested drive torque value; and motor locking determination means for determining whether or not the vehicle drive motor is in a locked state, wherein the control means gradually decreases a maximum drive torque value to a preset value if the motor locking determination means determines that the motor is in a locked state.

The vehicle drive motor control system according to the present invention is capable of, when a vehicle drive motor is in a locked state as a result of actuating an accelerator, making the vehicle slowly move backward by decreasing a maximum drive torque value, in order to urge a driver to make a switch from the actuation of the accelerator to actuation of a brake.

The vehicle drive motor control system according to the present invention is capable of, when the vehicle drive motor is in a locked state, switching a coil to which current is applied inside the motor from a coil whose temperature has been increased as a result of current application to another coil by making the vehicle move backward.

BRIEF DESCRIPTION OF THE DRAWINGS

A more complete appreciation of the subject matter of the present invention and the various advantages thereof can be realized by reference to the following detailed description in which reference is made to the accompanying drawings in which:

FIG. 5 is a timing chart for drive torque limitation according to a temperature of a coil (related art).

DETAILED DESCRIPTION

In describing embodiments of the invention discussed herein, specific terminology will be used for the sake of clarity. However, the invention is not intended to be limited to any specific terms used herein, and it is to be understood that each specific term includes all technical equivalents, which operate in a similar manner to accomplish a similar purpose.

Hereinafter, an embodiment of the present invention will be described with reference to the drawings.

Figure 1:
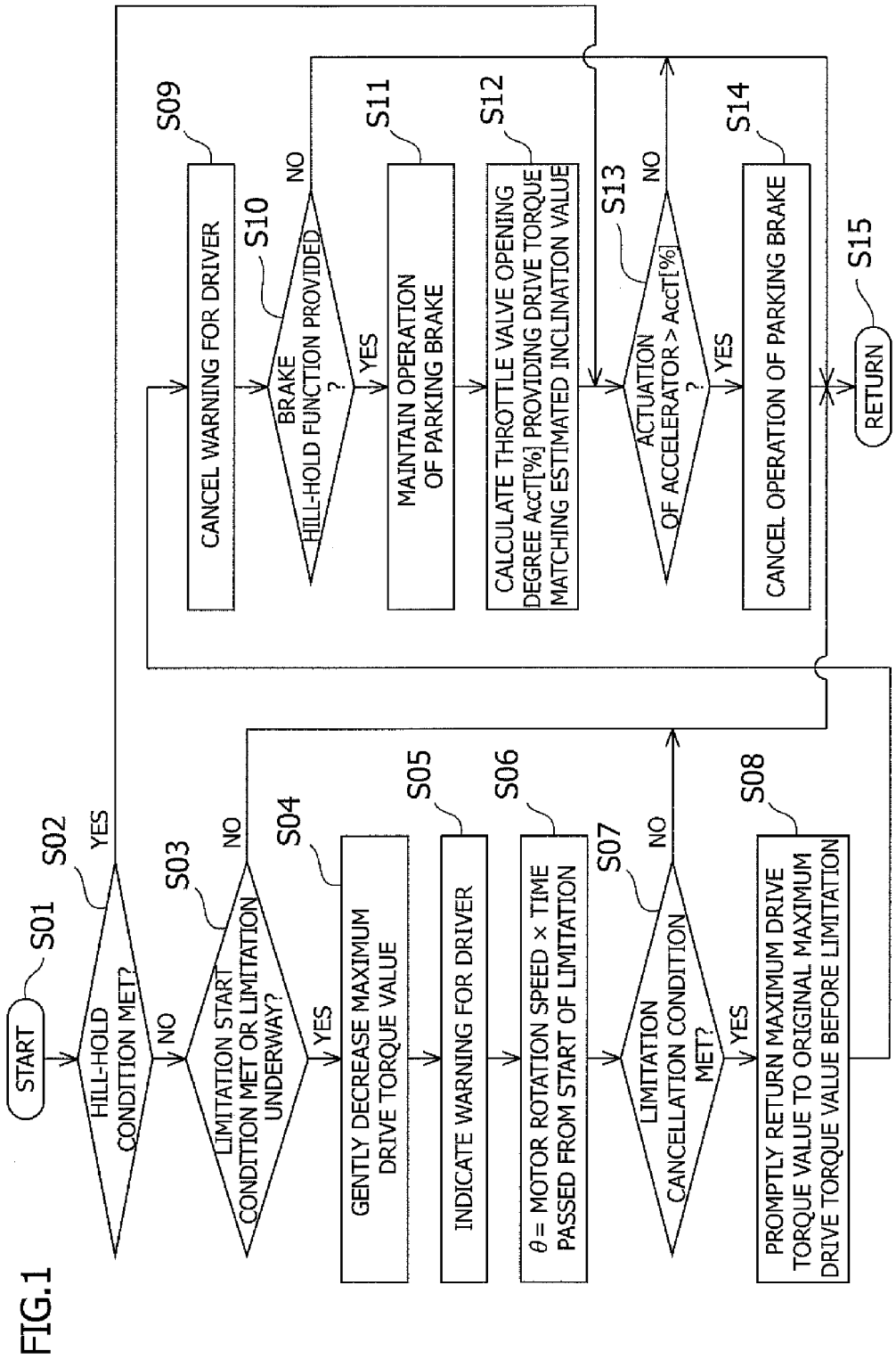
FIG. 1 is a flowchart for a vehicle drive motor control system (embodiment)
Figure 2:
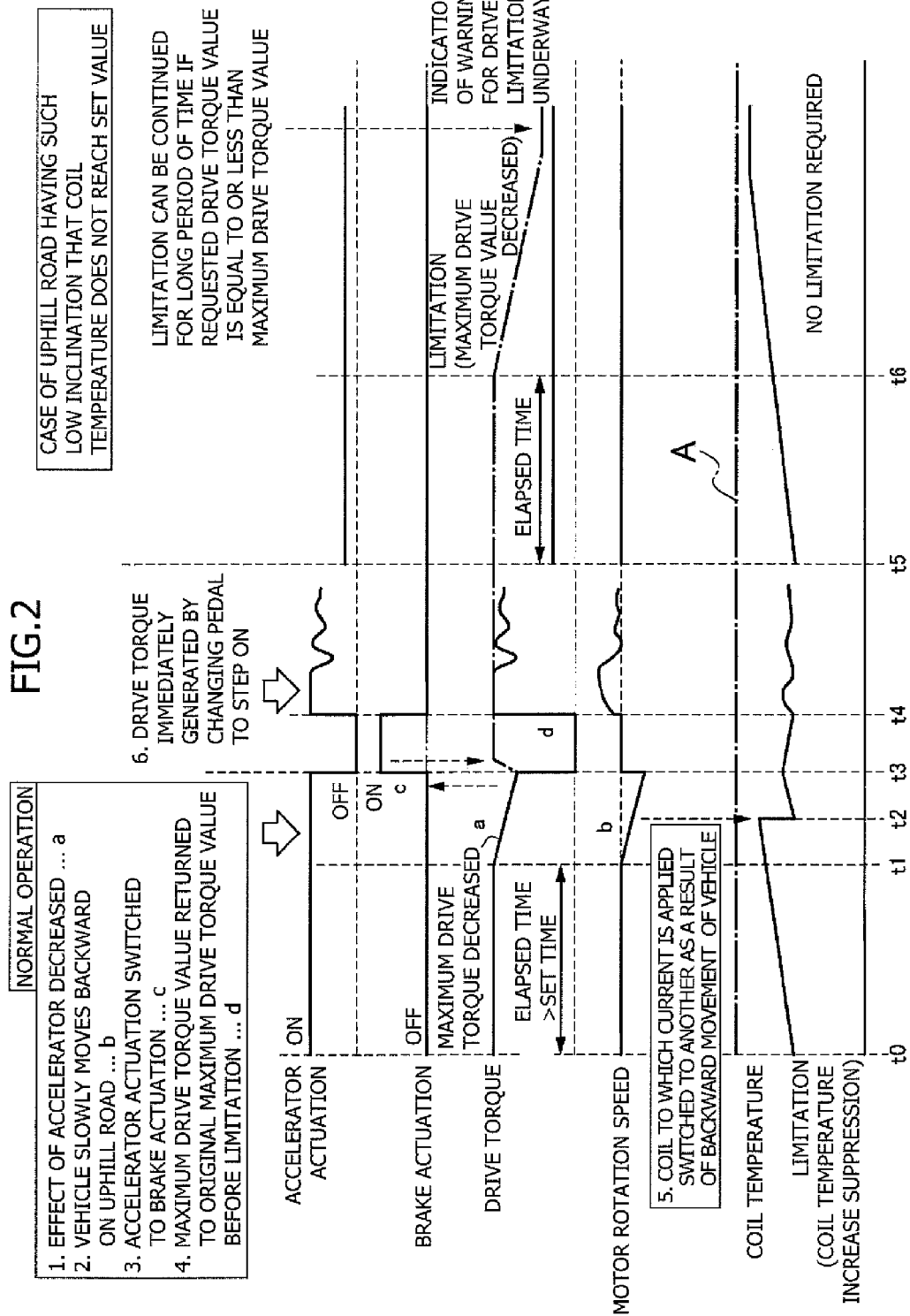
FIG. 2 is a timing chart for a vehicle drive motor control system (embodiment)
Figure 3:
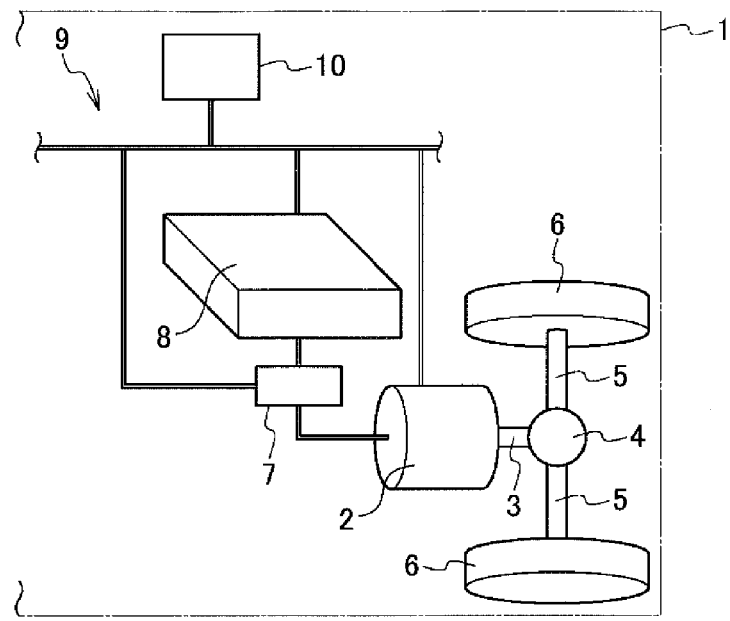
FIG. 3 is a system diagram of a vehicle that is moved by a vehicle drive motor (embodiment)

FIGS. 1 to 4 illustrate an embodiment of the present invention. In FIG. 3, reference numeral 1 denotes a vehicle such as an electric vehicle or a series hybrid vehicle. The vehicle 1 includes a vehicle drive motor (hereinafter referred to as "motor") 2. The motor 2 connects a motor shaft 3 to a differential gear 4. Wheels 6 are connected to the differential gear 4 via an axle 5. The motor 2 is connected to a high-voltage battery 8 via an inverter 7, which is a voltage conversion means. The inverter 7 converts a direct-current voltage from the high-voltage battery 8 to an alternating-current voltage and supplies the alternating-current voltage to the motor 2. The motor 2 generates a drive torque, using the alternating-current voltage. The drive torque generated by the motor 2 is transmitted from the differential gear 4 to the wheels 6 via the axle 5, thereby making the vehicle 1 move.

Figure 4:
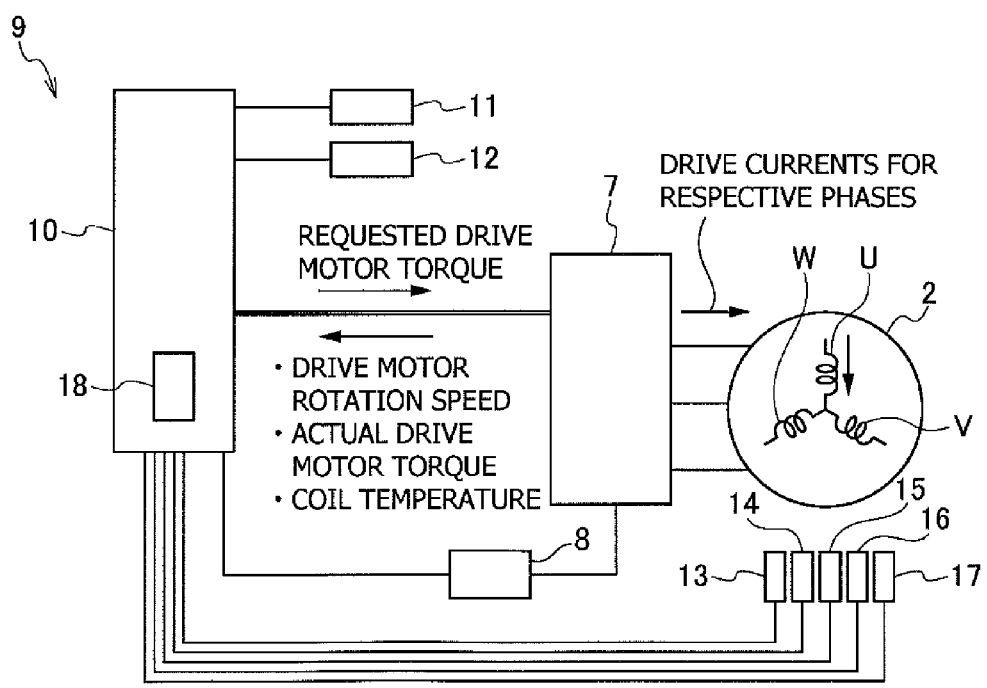
FIG. 4 is a block diagram of a vehicle drive motor control system (embodiment)

As illustrated in FIG. 4, the motor 2 includes a three-phase alternating-current motor including coils U, V and W of U, V and W phases. The inverter 7 converts the direct-current voltage from the high-voltage battery 8 to alternating-current voltages for three phases, i.e., the U phase, the V phase and the W phase, and supplies the alternating-current voltages to the coils U, V and W of the respective phases. The inverter 7 and the high-voltage battery 8 are connected to control means 10 in a vehicle drive motor control system 9.

The control means 10 in the vehicle drive motor control system 9 includes accelerator actuation amount detection means 11 for detecting an accelerator actuation amount for a vehicle, brake actuation amount detection means 12 for detecting a brake actuation amount for the vehicle, motor rotation speed detection means 13 for detecting a motor rotation speed, drive torque detection means 14 for detecting a drive torque, coil temperature detection means 15, 16 and 17 for detecting temperatures of respective coils U, V and W inside the motor, and motor locking determination means 18 for determining whether or not the motor 2 is in a locked state.

The control means 10 calculates a requested drive torque value based on the accelerator actuation amount detected by the accelerator actuation amount detection means 11, and controls the alternating-current voltages output from the inverter 7 according to the requested drive torque value to control driving of the motor 2. Meanwhile, when the motor 2 is driven by a drive force from the wheels 6 during, e.g., the vehicle 1 slowing down, the control means 10 performs regenerative control of the inverter 7 so as to collect the generated power into the high-voltage battery 8. Accordingly, the motor 2 is a dynamotor that functions as a motor as well as a generator.

The control means 10 in the vehicle drive motor control system 9 makes the motor locking determination means 18 determine that the motor 2 is in a locked state if a state in which the motor rotation speed detected by the motor rotation speed detection means 13 is less than a preset value and the drive torque detected by the drive torque detection means 14 is greater than a preset value lasts for a preset period of time.

If the motor locking determination means 18 has determined that the motor 2 is in a locked state, the control means 10 gradually decreases a maximum drive torque value of the motor 2 to a preset value.

When decreasing the maximum drive torque value, the control means 10 decreases the maximum drive torque value to a drive torque with which the coils U, V and W of the respective phases inside the motor are not thermally damaged even though the motor 2 is continuously driven at a normal atmospheric temperature.

Also, the control means 10 limits the maximum drive torque value to the preset value until the brake actuation amount detection means 12 detects that a brake is turned on.

The control means 10 sets time required from the detection of turning-on of the brake by the brake actuation amount detection means 12 to cancellation of the limitation of the maximum drive torque value to be equal to or shorter than time generally required to make a switch from actuation of a brake to actuation of an accelerator.

Furthermore, the control means 10 sets the requested drive torque value to 0 if the temperature of the coil U, V or W detected by the coil temperature detection means 15, 16 or 17 exceeds a preset value.

Next, control performed by the vehicle drive motor control system 9 will be described with reference to the flowchart in FIG. 1. Among vehicles 1, there is one having a brake hill-hold function that maintains a brake-actuated state by prolonging operation of a mechanical parking brake for a predetermined time after a brake being turned off, depending on the result of detection of the inclination of the vehicle 1. Therefore, in FIG. 1, control performed by the vehicle drive motor control system 9 including determination of whether or not the vehicle has a brake hill-hold function will be described.

In FIG. 1, upon the control means 10 starting a control program when the vehicle 1 stops on an uphill road by actuating the accelerator (S01), the control program determines whether or not a hill-hold condition is met (S02). The hill-hold condition is met if the vehicle 1 has a brake hill-hold function and is under a brake hill-hold operation.

If the result of the determination (S02) is YES, the control program jumps to determination (S13). If the result of the determination (S02) is NO, the program determines whether or not a limitation start condition for starting limiting the maximum drive torque value of the motor 2 is met or whether or not the limitation of the maximum drive torque value is underway (S03). The limitation start condition is met if it has been determined that the motor 2 is in a locked state as a result of a state in which the motor rotation speed is less than the set value and the drive torque of the motor 2 is greater than the set value being continued for the set period of time.

If the result of the determination (S03) is NO, the program jumps to RETURN (S15). If the result of the determination (S03) is YES, the control program gradually decreases the maximum drive torque value of the motor 2 to the preset value (S04), and indicates a warning for a driver by means of, e.g., a blinking warning light (S05). The decrease of the maximum drive torque value is made spending a set period of time until, for example, the maximum drive torque value at the start of the limitation is decreased to a value one-half such maximum drive torque value. Furthermore, when the maximum drive torque value is decreased, the maximum drive torque value is decreased to the drive torque with which the coils U, V and W of the respective phases inside the motor are not thermally damaged even though the motor 2 is continuously driven at a normal atmospheric temperature.

Subsequent to the indication of the warning (S05), the control program calculates a rotational angle θ of the motor shaft 3 according to an expression, i.e., θ=motor rotation speed*time passed from the start of the limitation (S06), and determines whether or not a limitation cancellation condition for cancelling the limitation of the maximum drive torque value is met (S07). The limitation cancellation condition is met if the rotational angle θ exceeds an angle corresponding to one phase provided by each of the coils U, V and W, the accelerator is off (the accelerator is not actuated) and the brake is on (the brake is actuated). Accordingly, the maximum drive torque value is limited to the preset value until the brake actuation amount detection means 12 detects that the brake is turned on.

If the result of the determination (S07) is NO, the control program jumps to RETURN (S15). If the result of the determination (S07) is YES, the control program promptly returns the maximum drive torque value to the original maximum drive torque value before the limitation (S08), and cancels the warning for the driver (S09). Time required from the detection of the turning-on of the brake by the brake actuation amount detection means 12 to cancellation of the limitation of the maximum drive torque value is set to be equal to or shorter than time normally required to make a switch from actuation of a brake to actuation of an accelerator (for example, time required to change the pedal to step on from an accelerator pedal to a brake pedal).

Subsequent to the cancellation of the warning (S09), the control program determines whether or not the vehicle 1 has a brake hill-hold function (S10). If the result of the determination (S10) is NO, the program jumps to RETURN (S15). If the result of the determination (S10) is YES, the control program maintains operation of a parking brake (S11), calculates a throttle valve opening degree AccT that provides a drive torque matching an estimated value of the inclination of the uphill road (S12), and determines whether or not a throttle valve opening degree resulting from actuation of the accelerator exceeds the throttle valve opening degree AccT (S13).

If the result of the determination (S13) is NO, the control program jumps to RETURN (S15). If the result of the determination (S13) is YES, the control program cancels the operation of the parking brake (S14) and proceeds to RETURN (S15).

Control performed by the vehicle drive motor control system 9 will be described with reference to the timing chart in FIG. 2.

In FIG. 2, when the vehicle 1 starts stopping on an uphill road with a high inclination by actuating the accelerator, rather than using the brake, the uphill road having such a high inclination that the temperature of a coil reaches the set value A (t0), if a state in which the motor rotation speed is less than the set value and the drive torque of the motor 2 is greater than the set value lasts for a set period of time (t1), and it has been determined that the motor 2 is in a locked state, the maximum drive torque value is gradually decreased and a warning is indicated even before the temperature of the coil U, V or W to which current is applied reaches the set value A (a).

As a result of the decrease of the maximum drive torque value (a), the effect of the accelerator is decreased and the vehicle 1 is made to slowly move backward. Consequently, the motor 2 is rotated (b), and when the rotational angle θ exceeds an angle corresponding to one phase provided by each of the coils U, V and W, the coil to which current is applied is switched from the coil whose temperature has increased as a result of the current application to another coil, and the coil temperature is decreased (t2).

When a driver notices the backward movement of the vehicle 1 by the warning, and stops the actuation of the accelerator and starts actuation of the brake (c) (t3), the limitation of the maximum drive torque value is cancelled and the drive torque is set to 0.

The vehicle 1 is held stopped by the actuation of the brake.

When the vehicle 1 is held stopped, if the driver stops the actuation of the brake and starts actuation of the accelerator (d) (t4), a drive torque is immediately generated.

When the vehicle 1 starts stopping on an uphill road by actuating the accelerator rather than using the brake, the uphill road having such a low inclination that the coil temperature does not reach the set value A (t5), and a state in which the motor rotation speed is less than the set value lasts for the set period of time (t6), if the requested drive torque value is equal to or less than the maximum drive torque value, the temperature of the coil U, V or W to which current is applied does not reach the set value A, and thus, the vehicle 1 can be stopped, or the back movement speed of the vehicle 1 can be changed, by actuating the accelerator, and a warning for the driver can be indicated while a limitation for decreasing the maximum drive torque value is provided. When the driver stops the actuation of the accelerator and starts actuation of the brake, the limitation of the maximum drive torque value is cancelled and the drive torque is set to 0. The vehicle 1 is held stopped by the actuation of the brake.

As described above, when the motor locking determination means 18 has determined that the motor 2 is in a locked state, the vehicle drive motor control system 9 gradually decreases the maximum drive torque value to the preset value.

Consequently, when the motor 2 is in a locked state as a result of actuation of the accelerator, the vehicle drive motor control system 9 decreases the maximum drive torque value to make the vehicle 1 slowly move backward, thereby urging the driver to make a switch from the actuation of the accelerator to the actuation of the brake. Furthermore, as a result of making the vehicle 1 move backward, the vehicle drive motor control system 9 can switch a coil to which current is applied among the three-phase coils U, V and W inside the motor from a coil whose temperature has increased as a result of the current application to another coil.

The vehicle drive motor control system 9 makes the control means 10 decrease the maximum drive torque value to a drive torque with which the coils U, V and W inside the motor are not thermally damaged even though the motor 2 is continuously driven at a normal atmospheric temperature, enabling adjustment of the backward movement speed of the vehicle 1 by the driver's actuation of the accelerator if the vehicle is on a gentle uphill road, while avoiding thermal damage to the coils U, V and W inside the motor.

The vehicle drive motor control system 9 makes the control means 10 limit the maximum drive torque value to the preset value until the brake actuation amount detection means 12 detects that the brake is turned on, enabling avoiding the locked state of the motor from being continued as a result of the driver increasing the amount of actuation of the accelerator.

The vehicle drive motor control system 9 makes the control means 10 set time required from detection of turning-on of the brake by the brake actuation amount detection means 12 to cancellation of the limitation of the maximum drive torque value to be equal to or shorter than time normally required to make a switch from actuation of a brake to actuation of an accelerator, to return the maximum drive torque value to the original maximum torque value before the limitation while the driver switches from the actuation of the brake to the actuation of the accelerator, enabling the vehicle to make a normal hill start.

The drive motor control system 9 makes the control means 10 determine that the motor 2 is in a locked state if a state in which the motor rotation speed detected by the motor rotation speed detection means 13 is less than the preset value, and the drive torque detected by the drive torque detection means 14 is greater than the preset value lasts for the preset period of time, enabling the drive torque to be decreased before the coils U, V and W inside the motor are overheated.

The drive motor control system 9 makes the control means 10 set the requested drive torque value to 0 if the temperature of the coil U, V or W detected by the coil temperature detection means 15, 16 or 17 exceeds the preset value, so as not to exceed a temperature limit of the coils U, V and W inside the motor, enabling avoidance of thermal damage to the coils U, V and W, and protection of the coils inside the motor even at a high temperature outside.

The present invention is capable of, when a vehicle drive motor is in a locked state as a result of actuation of an accelerator, urging a driver to make a switch from the actuation of the accelerator to actuation of a brake, thereby switching a coil to which current is applied from a coil whose temperature has increased as a result of the current application to another coil inside the motor, and is applicable to a transport apparatus including a vehicle drive motor.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

It will also be appreciated that the various dependent claims and the features set forth therein can be combined in different ways than presented in the initial claims. It will also be appreciated that the features described in connection with individual embodiments may be shared with others of the described embodiments.

The invention claimed is:

1. A vehicle drive motor control system comprising:
voltage conversion means for converting a direct-current voltage to an alternating-current voltage and supplying the alternating-current voltage to a vehicle drive motor;
accelerator actuation amount detection means for detecting an accelerator actuation amount for a vehicle;
brake actuation amount detection means for detecting a brake actuation amount for the vehicle;
control means for calculating a requested drive torque value based on the accelerator actuation amount detected by the accelerator actuation amount detection means, and controlling the alternating-current voltage output from the voltage conversion means, according to the requested drive torque value; and
motor locking determination means for determining whether or not the vehicle drive motor is in a locked state,
wherein the control means gradually decreases a maximum drive torque value to a preset value if the motor locking determination means determines that the motor is in a locked state;
wherein the control means limits the maximum drive torque value to the preset value until the brake actuation amount detection means detects that a brake of the vehicle is turned on; and
wherein the control means sets the time required from the detection of turning-on of the brake by the brake actuation amount detection means to cancellation of the limitation of the maximum drive torque value to be equal to or shorter than the time normally required to make a switch from actuation of the brake to actuation of an accelerator.

2. The vehicle drive motor control system according to claim 1, wherein the control means decreases the maximum drive torque value to a drive torque with which a coil inside the motor is not thermally damaged even though the vehicle drive motor is continuously driven at a normal atmospheric temperature.

3. The vehicle drive motor control system according to claim 2, further comprising:
motor rotation speed detection means for detecting a motor rotation speed; and
drive torque detection means for detecting a drive torque,
wherein the motor locking determination means determines that the vehicle drive motor is in a locked state if a state in which the motor rotation speed detected by the motor rotation speed detection means is less than a preset value and the drive torque detected by the drive torque detection means is greater than a preset value lasts for a preset period of time.

4. The vehicle drive motor control system according to claim 3, further comprising coil temperature detection means for detecting a temperature of a coil inside the motor,
wherein the control means sets the requested drive torque value to 0 if the temperature of the coil detected by the coil temperature detection means exceeds a preset value.

5. The vehicle drive motor control system according to claim 1, further comprising:
motor rotation speed detection means for detecting a motor rotation speed; and
drive torque detection means for detecting a drive torque,
wherein the motor locking determination means determines that the vehicle drive motor is in a locked state if a state in which the motor rotation speed detected by the motor rotation speed detection means is less than a preset value and the drive torque detected by the drive torque detection means is greater than a preset value lasts for a preset period of time.

6. The vehicle drive motor control system according to claim 5, further comprising coil temperature detection means for detecting a temperature of a coil inside the motor,
wherein the control means sets the requested drive torque value to 0 if the temperature of the coil detected by the coil temperature detection means exceeds a preset value.

7. The vehicle drive motor control system according to claim 1, further comprising coil temperature detection means for detecting a temperature of a coil inside the motor,
wherein the control means sets the requested drive torque value to 0 if the temperature of the coil detected by the coil temperature detection means exceeds a preset value.

* * * * *